United States Patent
Ko et al.

(10) Patent No.: US 10,476,729 B2
(45) Date of Patent: Nov. 12, 2019

(54) METHOD AND APPARATUS FOR SPATIAL MODULATION BASED ON VIRTUAL ANTENNA

(71) Applicant: LG ELECTRONICS INC., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 15/549,135

(22) PCT Filed: Feb. 4, 2015

(86) PCT No.: PCT/KR2015/001146
§ 371 (c)(1),
(2) Date: Aug. 4, 2017

(87) PCT Pub. No.: WO2016/125929
PCT Pub. Date: Aug. 11, 2016

(65) Prior Publication Data
US 2018/0026825 A1 Jan. 25, 2018

(51) Int. Cl.
*H04B 7/06* (2006.01)
*H04L 27/36* (2006.01)
(Continued)

(52) U.S. Cl.
CPC ......... *H04L 27/362* (2013.01); *H04B 7/0602* (2013.01); *H04B 7/0604* (2013.01);
(Continued)

(58) Field of Classification Search
None
See application file for complete search history.

(56) References Cited

U.S. PATENT DOCUMENTS

2008/0008258 A1* 1/2008 Tanabe ............... H04L 25/0204
375/267
2008/0037673 A1* 2/2008 Ahn ..................... H04B 7/0413
375/261

(Continued)

OTHER PUBLICATIONS

PCT International Application No. PCT/KR2015/001146, Notification of Transmittal of the International Search Report and the Written Opinion of the International Searching Authority, or Declaration dated Nov. 27, 2015, 10 pages.

*Primary Examiner* — Brian S Roberts
(74) *Attorney, Agent, or Firm* — Lee, Hong, Degerman, Kang & Waimey (57) ABSTRACT

Disclosed is a method of transmitting signals by a transmitting side device having multiple antennas. In this method, the transmitting side device spatially modulates information to be transmitted, where the information is spatially modulated to be represented based on which antennas among the N antennas are selected to be used for transmission. And, the transmitting side device transmits the spatially modulated information through the selected antennas. Here, the number of the selected antennas for transmitting one transmission information unit (hereinafter, 'M' where M≤N) is plural. And, different sequence of the selected antennas represents different information to be transmitted.

13 Claims, 10 Drawing Sheets

(51) Int. Cl.
*H04L 27/34* (2006.01)
*H04B 7/0413* (2017.01)

(52) U.S. Cl.
CPC ........... *H04B 7/0669* (2013.01); *H04L 27/34* (2013.01); *H04B 7/0413* (2013.01); *H04B 7/0613* (2013.01)

(56) References Cited

U.S. PATENT DOCUMENTS

| | | | |
|---|---|---|---|
| 2010/0202561 A1* | 8/2010 | Gorokhov | H04L 27/0008 375/295 |
| 2011/0228728 A1* | 9/2011 | Baligh | H04B 7/0669 370/328 |
| 2013/0114437 A1* | 5/2013 | Yoo | H04J 11/005 370/252 |
| 2013/0336418 A1* | 12/2013 | Tomeba | H04L 1/0003 375/267 |
| 2014/0133598 A1 | 5/2014 | Murakami et al. | |
| 2014/0169409 A1 | 6/2014 | Ma et al. | |
| 2014/0321557 A1 | 10/2014 | Chang | |

\* cited by examiner

METHOD AND APPARATUS FOR SPATIAL MODULATION BASED ON VIRTUAL ANTENNA

CROSS-REFERENCE TO RELATED APPLICATIONS

This application is the National Stage filing under 35 U.S.C. 371 of International Application No. PCT/KR2015/001146, filed on Feb. 4, 2015, the contents of which is hereby incorporated by reference herein in its entirety.

TECHNICAL FIELD

The present invention relates to a wireless communication system, and more particularly, to an efficient spatial modulation scheme for achieving diversity gain and high transmission rate.

BACKGROUND ART

As one example of a wireless communication system to be improved by having the present invention apply thereto, 3GPP LTE ($3^{rd}$ generation partnership project long term evolution) (hereinafter abbreviated LTE) communication system is schematically described as follows.

Figure 1:
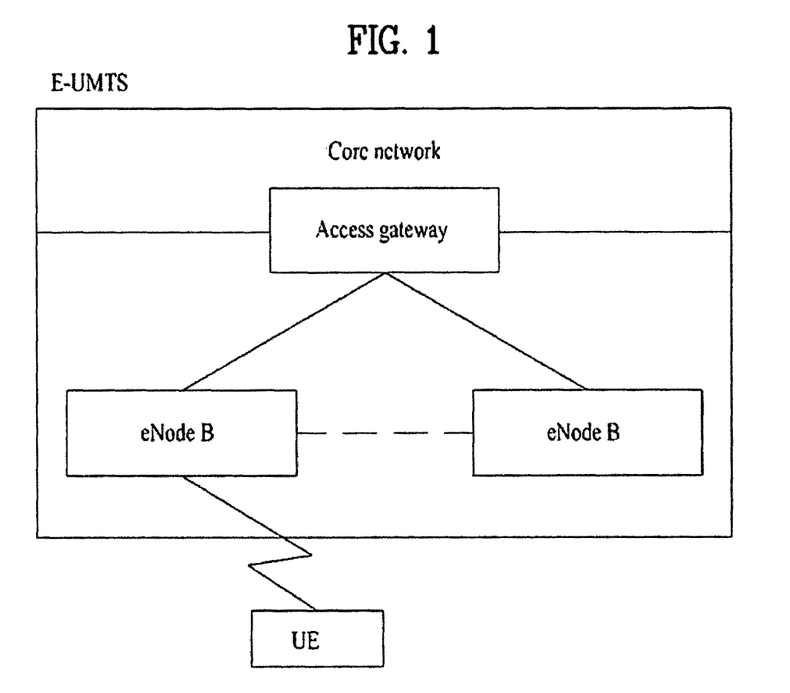
FIG. 1 is a schematic block diagram of E-UMTS network structure as one example of a wireless communication system.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

In order to improve performance of the related art LTE communication system mentioned in the above description, ongoing discussions are made on 5G communication technology. And, the 5G communication system is expected to use spatial modulation scheme based on massive MIMO technology.

Figure 2:
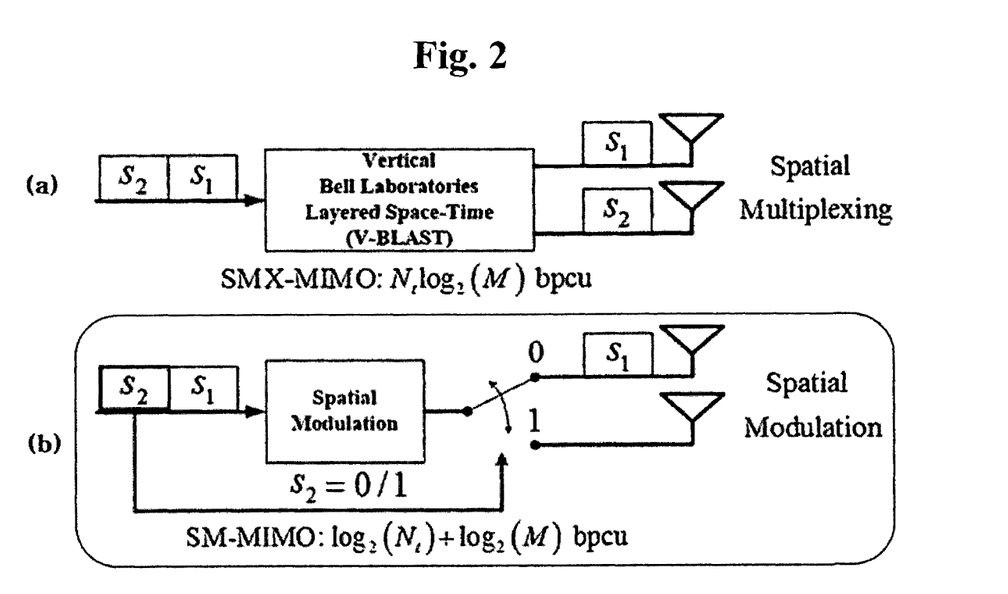
FIG. 2 is a diagram showing a difference between spatial multiplexing and spatial modulation.

FIG. 2 is a diagram showing a difference between spatial multiplexing and spatial modulation.

FIG. 2(a) is a diagram for explaining the spatial multiplexing scheme. According to spatial multiplexing scheme, different signals ($S_1$ and $S_2$) are transmitted via different transmission antennas. On the other hand, FIG. 2(b) is a diagram for explaining the spatial modulation scheme. According to spatial modulation scheme, $S_1$ is transmitted via antenna 0 or 1, and selection of antenna 0/1 represents $S_2$. That is, $S_2$ can be represent not based on the signals transmitted via each antenna, but based on selection of antennas for transmission.

So, spatial modulation (SM) can be referred to as a single-RF multiple-antenna transmission technique. The smaller RF-chain number and low detection complexity at the receiver of spatial modulation make it an energy-efficient modulation method for the massive MIMO system. According to Massive MIMO scheme to be employed to 5G standardization technology, the targeted MIMO dimension may amount up to hundreds of antennas and the transmitter and receiver.

However, the above explained spatial modulation has a problem in that it may suffer antenna specific error. For example, when the channel of antenna 0 is poor in the example of FIG. 2(b), the transmission of $S_1$ via antenna 0 might fail. So, the spatial modulation has to be modified to have spatial diversity gain.

Further, the transmission rate of spatial modulation is lower than spatial multiplexing scheme. For example, when there are Nt transmission antennas, and one symbol ($S_1$) represents M information, the spatial multiplexing scheme can convey $N_t \log_2 (M)$ bits for one transmission. On the other hand, for the same environment, spatial modulation scheme can convey $\log_2 (N_t) + \log_2 (M)$ bit for one transmission.

DISCLOSURE

Technical Task

In the following description, efficient spatial modulation schemes for addressing the above problem are proposed.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one technical aspect of the present invention, provided herein is a method of transmitting signals by a transmitting side device having multiple antennas (hereinafter 'N antennas'), the method comprising: spatially modulating information to be transmitted, wherein the information is spatially modulated to be represented based on which antennas among the N antennas are selected to be used for transmission; and transmitting the spatially modulated information through the selected antennas, wherein a number of the selected antennas for transmitting one transmission information unit (hereinafter, 'M' where M≤N) is plural, and wherein different sequence of the selected antennas represents different information to be transmitted.

The one transmission information unit may be generated based on linear combination of a plurality of information units. And, the number of the plurality of information units may correspond to M.

Each of the information units may correspond to a QAM (Quadrature Amplitude Modulation) symbol.

The number of the selected antennas (M) may be equal to the number of multiple antennas (N).

'01' and '10' may be used for representing different information to be transmitted, where 'M' is 2, '01' represents a first case where the one transmission information unit is transmitted through a first antenna first of the 2 antennas and then a second antenna of the 2 antennas, and '10' represents a second case where the one transmission information unit is transmitted through the second antenna first and then the first antenna. Preferably, '00' and '11' are not used for representing the information to be transmitted.

The one transmission information unit may be generated by $(S1-S2)\sqrt{2}$, or $(S1+S2)\sqrt{2}$, and 'S1' and 'S2' represent each of information units.

The method may further comprises: exchanging information on which sequence of the selected antennas represents which information to be transmitted with a receiving side device.

In another aspect of the present invention, a method of receiving signals transmitted via multiple transmission antennas (hereinafter 'N antennas') by a receiving side device, the method comprising: estimating channels between one or more reception antennas and the multiple transmission antennas; receiving spatially modulated information based on the estimated channel information; and demodulating the spatially modulated information, wherein the spatially modulated information is represented based on which transmission antennas among the N antennas were used for transmission; and wherein a number of the used transmission antennas used for transmitting one transmission information unit (hereinafter, 'M' where M≤N) is plural, and wherein different sequence of the transmission antennas used for transmission represents different information, is provided.

The one transmission information unit may be generated based on linear combination of a plurality of information units, and the number of the plurality of information units may correspond to M.

Each of the information units may correspond to a QAM (Quadrature Amplitude Modulation) symbol.

The number of the transmission antennas (M) used for transmission may be equal to the number of multiple transmission antennas (N).

'01' and '10' may be used for representing different information, where 'M' is 2, '01' represents a first case where the one transmission information unit is transmitted through a first transmission antenna first of the 2 transmission antennas and then a second antenna of the 2 antennas, and '10' represents a second case where the one transmission information unit is transmitted through the second transmission antenna first and then the first transmission antenna.

In this case, '00' and '11' may not be used for representing the information.

The one transmission information unit may be generated by $(S1-S2)\sqrt{2}$, or $(S1+S2)\sqrt{2}$, and 'S1' and 'S2' may represent each of information units.

Advantageous Effects

According to the present invention, wireless communication can enjoy the efficient spatial modulation without antenna specific error and/or reduction on the transmission efficiency due to the spatial modulation.

Effects obtainable from the present invention may be non-limited by the above-mentioned effects. And, other effects not recited can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Best Mode for Invention

Reference will now be made in detail to the preferred embodiments of the present invention, examples of which are illustrated in the accompanying drawings. In the following detailed description of the invention includes details to facilitate the full understanding of configurations, functions and other features of the present invention. The embodiments mentioned in the following description include the examples of applying the technical features of the invention to 3GPP systems.

Although embodiments of the invention are described in the present specification using LTE system and LTE-A system for example, they are applicable to any communication systems corresponding to the above definitions.

Figure 3:
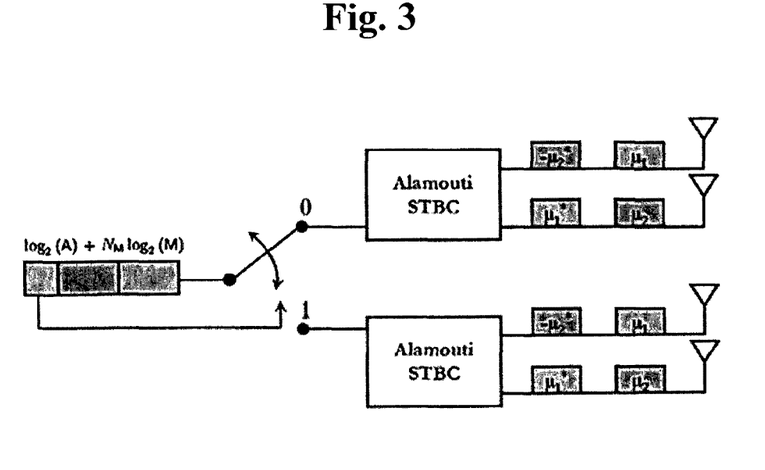
FIG. 3 is a diagram for explaining spatial modulation scheme combined with Alamouti scheme to be used for the present invention.

FIG. 3 is a diagram for explaining spatial modulation scheme combined with Alamouti scheme to be used for the present invention.

For this combined scheme, first step is antenna selection for bit mapping in spatial constellation as a spatial modulation scheme. For example of transmitting information 'A', 'B' and 'C', information 'A' can be represented by selection of antenna block 0 or 1. In FIG. 3, each antenna block comprises 2 antennas.

Then the information 'B' and 'C' can be transmitted based on Alamouti scheme for signal constellation. The transmission of information 'B' and 'C' is performed via 2 antenna of the selected antenna block based on the information 'A'.

When the information 'B' and 'C' are correctively represented as the information 'M', the transmission rate for this combined scheme can be represented as:

$$R = \log_2(A) + \frac{N_M \log_2(M)}{T_s} \quad \text{[Equation 1]}$$

Here, Ts represents transmission time for transmitting information 'M' and NM represents the number of antennas for each antenna block selected based on the information 'A'.

When this combined scheme is represented as codeword structure, it can be represented as:

$$\{X_{11}, X_{12}\} = \left\{ \begin{pmatrix} x_1 & x_2 & 0 & 0 \\ -x_2^* & x_1^* & 0 & 0 \end{pmatrix}, \begin{pmatrix} 0 & 0 & x_1 & x_2 \\ 0 & 0 & -x_2^* & x_1^* \end{pmatrix} \right\} \quad \text{[Equation 2]}$$

Figure 4:
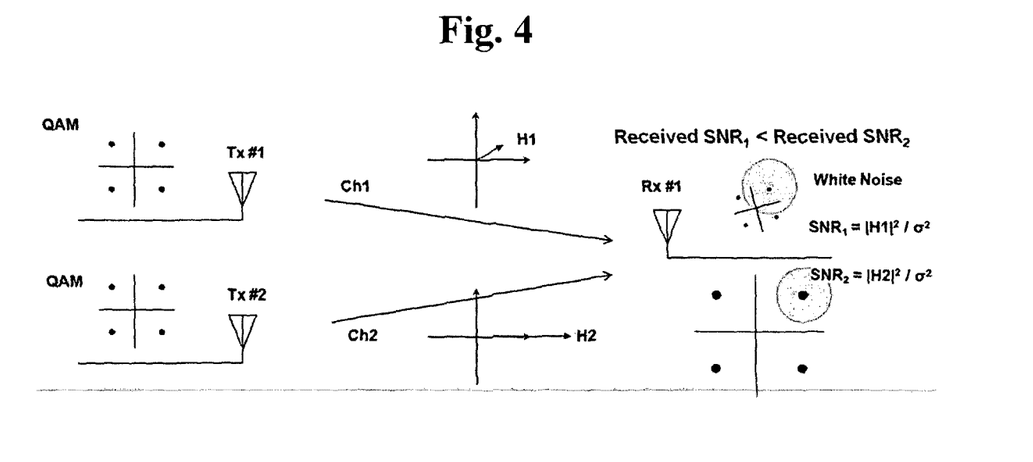
FIG. 4 is a diagram for explaining spatial modulation scheme combined with QAM scheme to be used for the present invention.

FIG. 4 is a diagram for explaining spatial modulation scheme combined with QAM scheme to be used for the present invention.

Spatial modulation scheme is a scheme representing information based on the difference between the spatial channels of each antenna. So, when each of channels are independent from each other, the information can be easily distinguished. Contrary, when each of channels has high correlation, it is hard for the receiving side device to distinguish the information. So, the spatial modulation scheme is preferable for a case when each antenna is independent from each other.

In order to increase the transmission rate, QAM modulation scheme can be combined with spatial modulation scheme. That is, each antenna can transmit QAM modulated symbol in this combined method. For example, when there are 4 transmission antennas and each antenna transmits QAM modulated symbol, total 4 bits information can be transmitted at one transmission instance.

On the other hand, QAM symbol detection performance is dependent on the amplitude of channel. So, if one specific channel among the transmission channels of multiple antennas is small, the performance of this transmission scheme would be depend on that specific channel.

For example of FIG. 4, if the channel H1 of transmission antenna #1 is much smaller than the channel H2 of transmission antenna #2, the received SNR of H1 would be much smaller than the received SNT of H2. So, the performance of spatial modulation would be determined based on this poor channel, H1.

Figure 5:
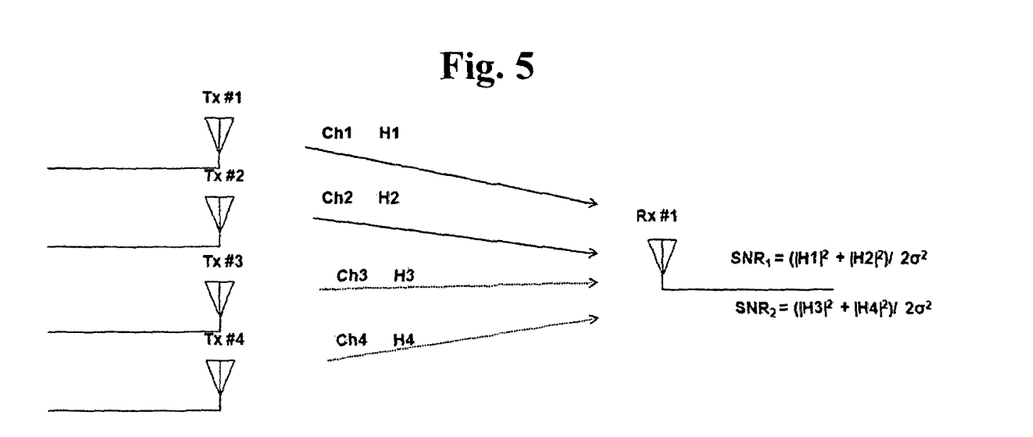
FIG. 5 is a diagram for explaining SNR of the received signals when spatial modulation scheme is combined with Alamouti scheme.

FIG. 5 is a diagram for explaining SNR of the received signals when spatial modulation scheme is combined with Alamouti scheme.

As stated above, the performance of spatial modulation scheme is determined based on specific poor channel among multiple channels. It is because the spatial modulation scheme reduce the spatial diversity gain.

To address this problem, the spatial modulation scheme can be used together with Alamouti scheme. Suppose there are 4 transmission antennas (Tx #1~Tx #4; as shown in FIG. 5) and each channel is represented as H1~H4. When Alamouti scheme is used by grouping the transmission antennas, the SNR1 and SNR 2 would be represented as:

$$SNR_1 = (|H1|^2 + |H2|^2)/2\sigma^2$$

$$SNR_2 = (|H3|^2 + |H4|^2)/2\sigma^2 \quad \text{[Equation 3]}$$

Even when the spatial modulation is combined with Alamouti scheme, the performance of this scheme would be determined based on poor combination among the above two antenna group. For example, when SNR1 is much less than SNR 2, the performance would be determined based on SNR1.

Figure 6:
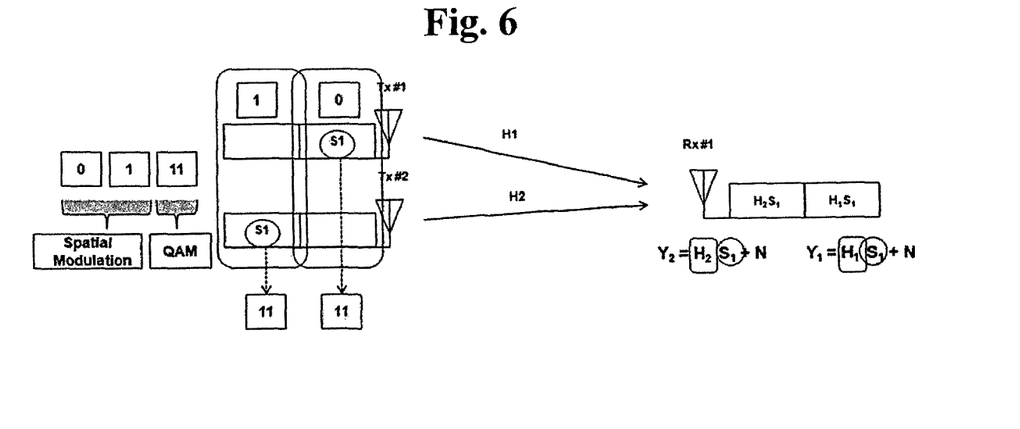
FIG. 6 is a diagram for explaining one exemplary spatial modulation scheme of present invention.

FIG. 6 is a diagram for explaining one exemplary spatial modulation scheme of present invention.

In order to achieve the antenna diversity gain, each symbol may be transmitted through multiple antennas, not just one antenna. For example, referring to FIG. 6, the information to be represented by spatial modulation is '01' and the information to be represented based on QAM is '11'. '0' for spatial modulation represents that the QAM symbol is transmitted via transmission antenna #1 and 1' for spatial modulation represents the QAM symbol is transmitted via transmission antenna #2.

In this example of the present invention, the information to be represented by spatial modulation comprises '01' and '10', but '00' and '11' are not used for representing information. So, the QAM symbol '11' would be transmitted via 2 transmission antennas regardless the information to be represented by spatial modulation.

In this case, the received signals for both of the information would be the same (only the sequence of the received signals would be different). So, the performance of this scheme can be averaged over the multiple antennas.

Figure 7:
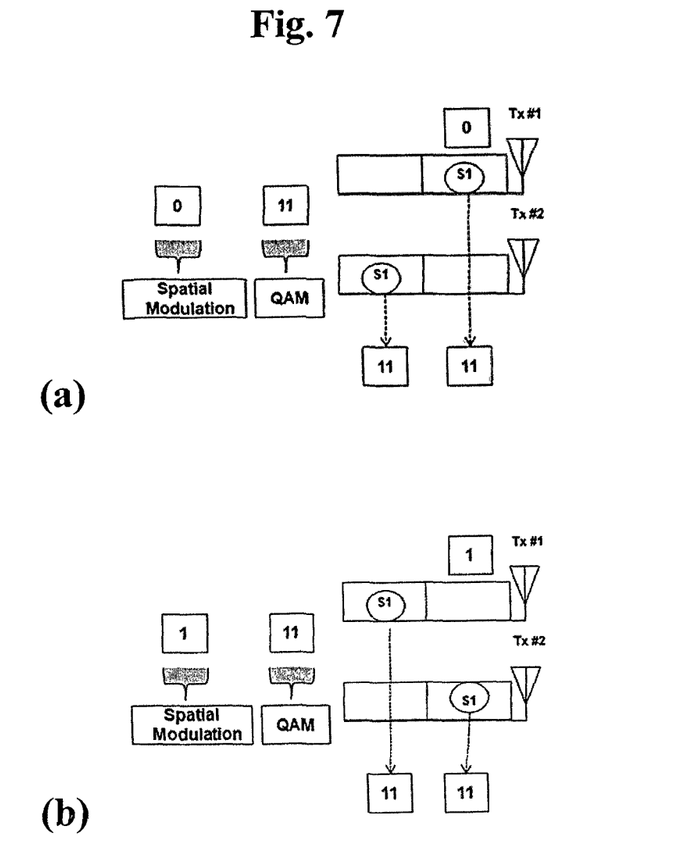
FIG. 7 is a diagram for explaining another exemplary spatial modulation scheme of present invention.

FIG. 7 is a diagram for explaining another exemplary spatial modulation scheme of present invention.

In this example, antenna patterns for representing information may be predetermined. And, this antenna pattern ensures that the signals are transmitted via multiple antennas.

As shown in the example of FIG. 7(a), '0' is predetermined to be represented by transmission of S1 via Tx #1 first, then via Tx #2. In FIG. 7(b), '1' is predetermined to be represented by transmission of S1 via Tx #2 first, then via Tx #1. Note that 51 would be transmitted both of Tx #1 and Tx #2 in any case.

In this example, QAM symbol 51 is represented as '11'.

Figure 8:
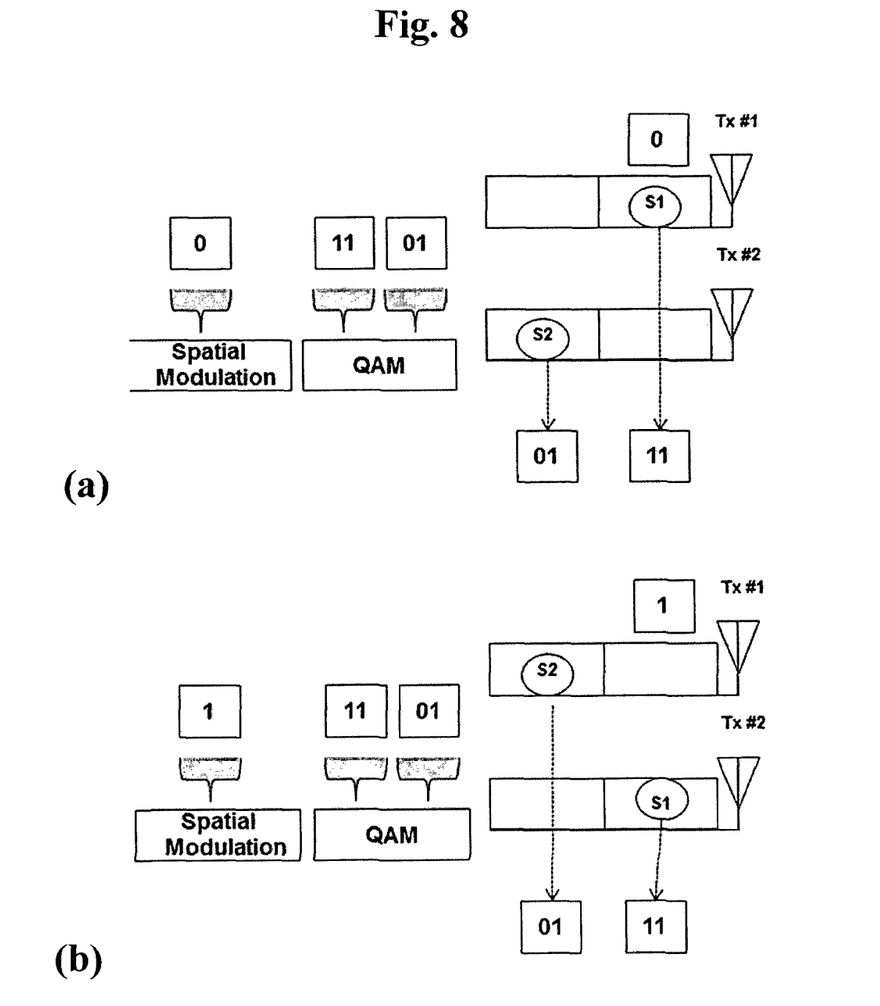
FIG. 8 is a diagram for explaining another exemplary spatial modulation scheme of present invention.

FIG. 8 is a diagram for explaining another exemplary spatial modulation scheme of present invention.

FIG. 8 is similar in that the antenna pattern for transmitting QAM symbol is predetermined to represent specific information. But, in this example, the transmission pattern of the combination of multiple symbols (e.g. S1 and S2) is used for representing information for spatial modulation.

Suppose '11' represents '51' and '01' is represents 'S2'. Both of them are QAM modulation symbols.

In this example, as shown in FIG. 8(*a*), '0' for spatial modulation is predetermined to be represented by transmitting S1 via Tx #1 first, then S2 via Tx #2. '1' for spatial modulation is predetermined to be represented by transmitting S1 via Tx #2 first, then S2 via Tx #1.

By using the above explained method, the SNR of the received symbols would be averaged over multiple channels, so the performance would not be determined based on the poorest channel.

But, the above method may reduce the transmission rate somewhat since the transmission of one QAM symbol takes multiple resources.

Figure 9:
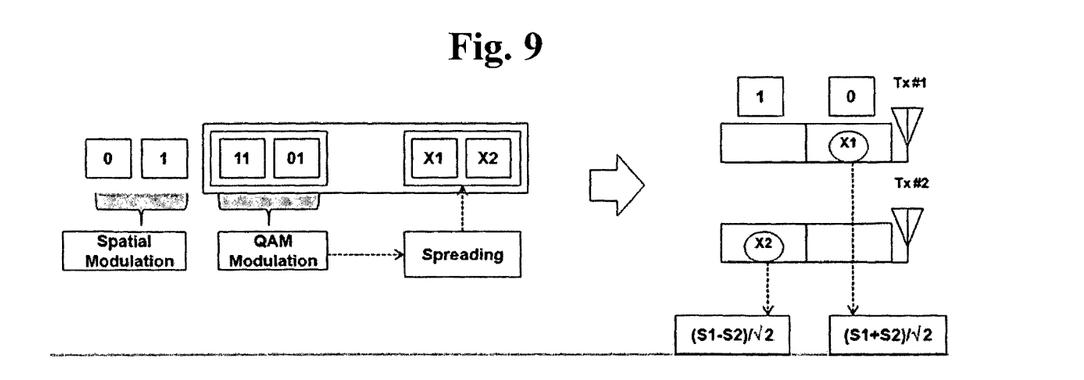
FIG. 9 is a diagram for explaining preferred example of the present invention.

FIG. 9 is a diagram for explaining preferred example of the present invention.

In this example of the present invention, the signals are transmitted via multiple resources as the examples previously explained. In addition to this, the present example proposes to multiplex the signals as on multiplexed signals and transmits this multiplexed signals via multiple resources to increase the transmission rate.

For example, when the symbols S1 is to be transmitted via antennas 1 and 2, the transmission rate would be reduce in half. But, when the symbols S1 and S2 are multiplexed as X1 (X1=(S1−S2)/√2), and when X1 is transmitted via antennas 1 and 2, there would be no reduction in transmission rate according to the present invention.

Multiplexed signals can be acquired based on Hadamard code or DFT.

The number of multiplexed signals into one symbol would be determined based on the number of transmission antennas to be used for transmitting that one multiplied symbol.

In the example of FIG. 9, spatial modulation codes '01' and '10' can be used. And, symbols S1 (11) and S2 (01) can be multiplexed as X1 and X2 by:

$$X1=(S1+S2)/\sqrt{2}$$

$$X2=(S1-S2)/\sqrt{2} \quad \text{[Equation 4]}$$

By using this scheme, spatial modulation scheme can be modified to have diversity gain without the reduction of transmission rate.

Figure 10:
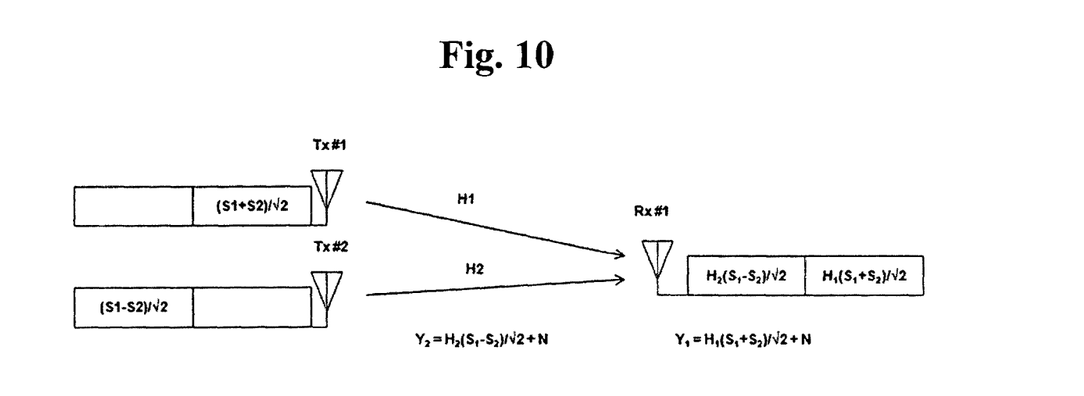
FIG. 10 is for explaining the reception of the signals transmitted based on FIG. 9.

FIG. 10 is for explaining the reception of the signals transmitted based on FIG. 9.

When the X1 and X2 are represented as the above Equation 4, and when 2 channels of transmission antennas 1 and 2 are represented as H1 and H2, the two received signals can be represented as:

$$Y_1 = H1(S1+S2)/\sqrt{2}+N$$

$$Y_2 = H2(S1-S2)/\sqrt{2}+N \quad \text{[Equation 5]}$$

Here, 'N' represents noise.

These received signals can be equalized as following Equations 6 and 7:

$$W_1(i)Y_1 = W_1(i)H_1(S_1+S_2)/\sqrt{2}+W_1(i)N \quad \text{[Equation 6]}$$

Where, $$W_1(1)=H_1*/\sqrt{2}|H_1|^2$$

$$W_1(2)=H_2*/\sqrt{2}|H_2|^2$$

$$W_2(i)Y_2 = W_2(i)H_2(S_1-S_2)/\sqrt{2}+W_2(i)N$$

Where, $$W_2(1)=H_2*/\sqrt{2}|H_2|^2$$

$$W_2(2)=H_1*/\sqrt{2}|H_1|^2 \quad \text{[Equation 7]}$$

In case of i=1, the above 2 signals can be summed as following:

$$W_1(1)Y_1 + W_2(1)Y_2 = \quad \text{[Equation 8]}$$
$$W_1(1)H_1(S_1+S_2)/\sqrt{2} + W_2(1)H_2(S_1-S_2)/\sqrt{2} +$$
$$W_1(1)N + W_2(1)N = (W_1(1)H_1 + W_2(1)H_2)S_1/\sqrt{2} +$$
$$(W_1(1)H_1 - W_2(1)H_2)S_2/\sqrt{2} + W_1(1)N + W_2(1)N =$$
$$(|H_1|^2/|H_1|^2 + |H_2|^2/|H_2|^2)S_1/2 +$$
$$(|H_1|^2/|H_1|^2 - |H_2|^2/|H_2|^2)S_2/2 +$$
$$W_1(1)N + W_2(1)N = S_1 + W_1(1)N + W_2(1)N$$

In case of i=2, the above 2 signals can be summed as following:

$$W_1(2)Y_1 + W_2(2)Y_2 = \quad \text{[Equation 9]}$$
$$(H_1H_2*/|H_2|^2 + H_2H_1*/|H_1|^2)S_1/2 +$$
$$(H_2H_1*/|H_1|^2 - H_1H_2*/|H_2|^2)S_2/2 +$$
$$W_1(2)N + W_2(2)N$$

The above mathematical modeling reveals that this scheme provides spatial diversity gain and better detection probability.

In the following, as another aspect of the present invention, method for spatial modulation by using the reference signals is explained.

In the conventional art, the reference signals (RSs) are used to estimate channel condition and/or to demodulate the received data based on the estimated channel. In MIMO technology, the reference signals are transmitted via each of antennas and they are used for estimating channel for each antenna.

On the other hand, one example of the present invention proposes to define the antenna(s) and/or antenna pattern for transmitting RSs, and this selection of antenna (pattern) is used to represent information other than the conventional information for RSs transmission.

Figure 11:
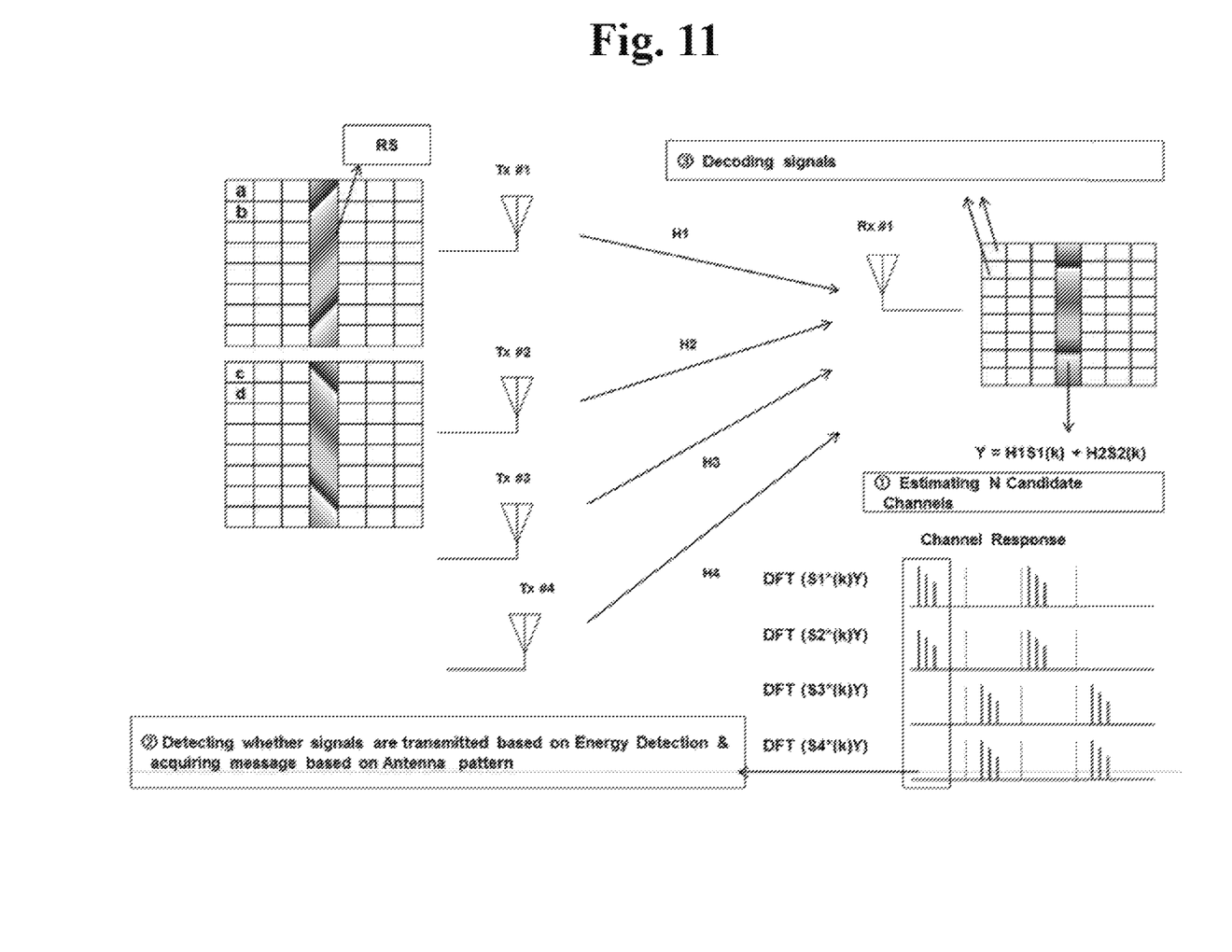
FIG. 11 is a diagram for explaining spatial modulation scheme based on the RS signals.

FIG. 11 is a diagram for explaining spatial modulation scheme based on the RS signals.

As exemplified in FIG. 11, suppose that there are 4 transmission antennas (Tx #1~Tx #4). In this example, the combination of RS 1 (a, b) and RS 2 (c, d) is transmitted with the antenna pattern of (1, 2), (3, 4), (2, 1) and (4, 3), where (x, y) represents antenna x is used for transmitting RS 1 and antenna y is used for transmitting RS 2. As a first step (①), the receiving side device may estimate 4 candidate channels based on the received RS signals. On the other hand, detection of antenna pattern used for transmitting RS signals is performed (e.g. energy detection) (Step ②).

The information acquired by step ① (first information) can be used for decoding signals (step ③) as the conventional RSs do. But, the information acquired by step ② (second information) can represent new type of information specifically designed for the present invention.

The newly designed information can comprise modulation order for data transmission, and/or additional information in addition to control information to be transmitted via control channel (e.g. hierarchical modulation triggering flag).

Also, this information can represent transmission scheme for data transmission. For example, when the RSs are detected at one antenna among multiple antennas, it may represent that the data shall be transmitted via single beamforming scheme. As another example, when the RSs are detected at two transmission antennas, it may represents that data shall be transmitted by dual beamforming scheme. Still another example, when the RSs are detected at multiple antennas and antenna selection pattern is changed within a predetermined time period, it may represent that the transmission scheme for data transmission shall be changed.

In another example, the new information can represent HARQ ACK/NACK for data transmission.

In further another example, the new information can represent the number of antennas for spatial modulation of data. For example, when the RSs are detected at N antennas, it may represent that the N antennas are used for spatial modulation of data. Also, a combination of the number of antennas in which RSs are detected and the antenna pattern may represent the number of antennas for spatial modulation of data. And, the new information can represent the antenna pattern for spatial modulation of data.

Figure 12:
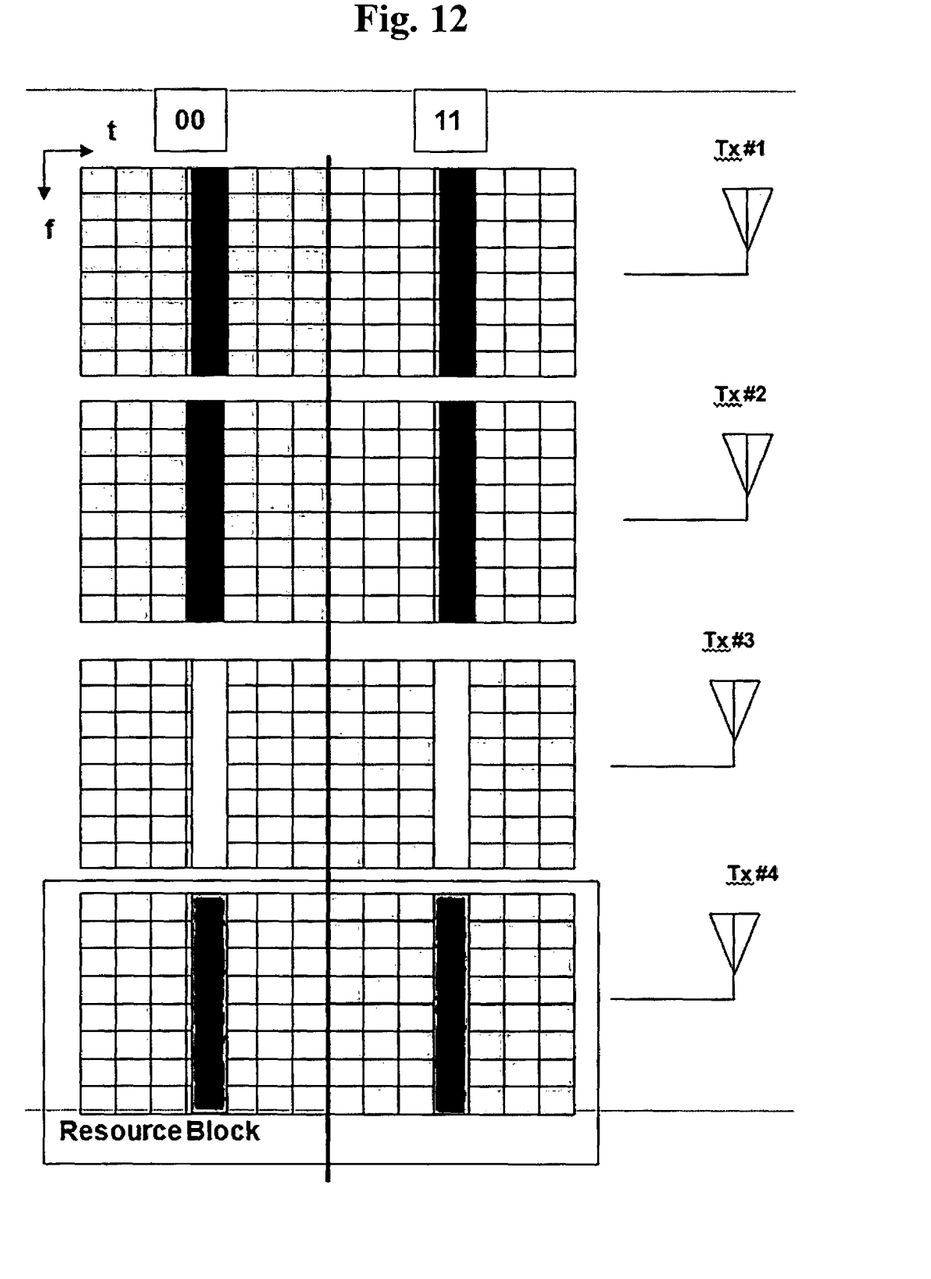
FIG. 12 is a diagram for explaining another example of the present invention for spatial modulation by using RSs.

FIG. 12 is a diagram for explaining another example of the present invention for spatial modulation by using RSs.

In this example, the time-frequency resource used for RSs transmission is further used for representing new information. In FIG. 12, there are two resource blocks for transmitting RSs at each transmission antenna. Different selection of resource block for transmitting RSs can be further used together with different selection of antenna to represent new information.

The reference signals to be used by the present invention may comprise various sequence, such as Zadoff-Chu sequence used for LTE/LTE-A system.

According to another aspect of the present invention, the spatial modulation scheme can be modified by configuring the combination of antennas.

According to this example of the present invention, when there are N transmission antennas, M antenna ports are configured from among N antennas. (M=<N). The M antenna port may comprise an antenna port configured as a combination of two or more antennas selected from among the N antennas. For example, when there are 4 transmission antennas, and each channel is represented as H1, H2, H3 and H4, the M antenna ports can be configured as following:

$Heq1=(H1+aH2)$ $Heq2=(H3+bH4)$ $Heq3=(H1+cH3)$ $Heq4=(H2+dH4)$ [Equation 10]

Here, 'a', 'b', 'c', and 'd' may represent weight for each channel. For example, M antenna ports may comprise a antenna port binding k antennas with phase shift. These M antenna ports can be used for beamforming, PVS and/or CDD.

The method may further comprise selecting L antenna pairs for data transmission from among the M antenna ports based on Alamouti coding, where L<M. Example of Alamouti coding combination can be represented as:

Candidate 1. $|Heq1|^2+|Heq2|^2$

Candidate 2. $|Heq3|^2+|Heq4|^2$ [Equation 11]

The transmitting side device (e.g. eNB) may transmit data by using the selected L antenna candidates. The receiving side device (e.g. a user equipment) may perform the blind decoding by using Alamouti coding and antenna port configuration.

Figure 13:
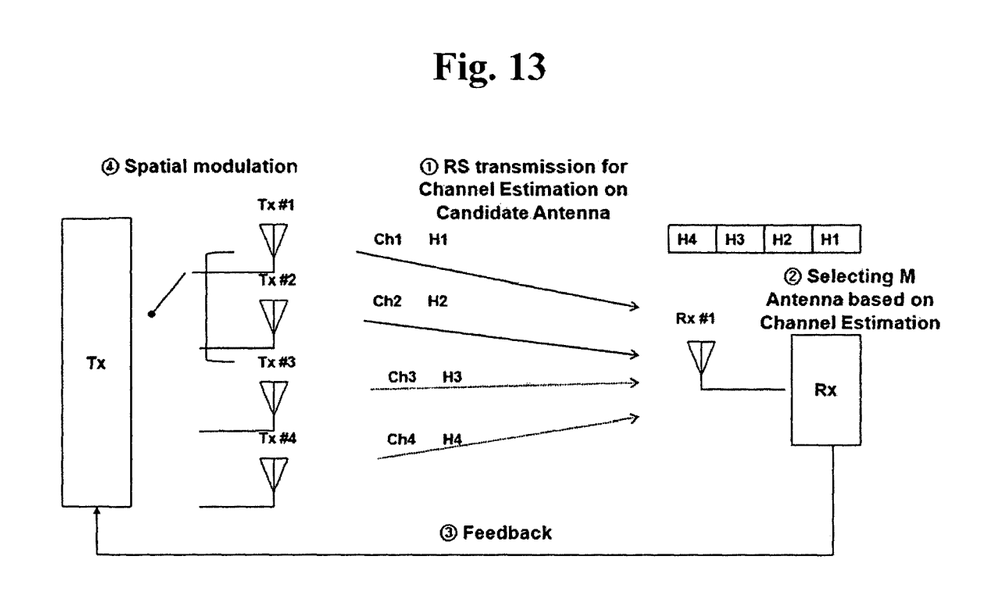
FIG. 13 is a diagram for explaining the spatial modulation scheme according to one embodiment of the present invention.

FIG. 13 is a diagram for explaining the spatial modulation scheme according to one embodiment of the present invention.

At step 1, the transmitting side device may transmit RS for channel estimation on the candidate antenna. In this example, the transmission of RS is performed via Tx #1~Tx #4. At step 2, the receiving side device may select M antennas based on the channel estimation. For example, the receiving side device may select Tx #1, #2 and #3 for data transmission. At step 3, the information on the selected M antennas may feed back to the transmitting side device. Also, the receiving side device may feed back the channel estimation information for all of H1~H4. At step 4, the transmitting side device may configure 2 antenna ports for data transmission and configure antenna port 1 as a combination of Tx #1 and Tx #2, and antenna port 2 from Tx #3. Then, the transmitting side device may transmit data via the above configured antenna ports 1 and 2.

In the above explanation, the antenna may comprise physical antenna, virtual antenna configured by multi-layer beamforming.

When the information is represented by the transmission antenna used for signals, the amount of information to be represented is determined based on the number of transmission antennas. For example, when there are 4 transmission antennas, the information of 2 bits can be represented based on the basic spatial modulation. When there are 8 antennas, 3 bits can be transmitted.

On the other hand, when virtual antenna part configured as stated above, the amount of information to be transmitted can increase. For example, when there are 4 transmission antennas and 2 transmission antennas are to be selected for configuring one virtual antenna port, there are 6 cases for this configuration. When selecting 2 antennas from among 8 antennas, there are 28 cases to be represented, so 4 bits information can be delivered.

But, the more the combinations are defined, the more complex the detection of the receiving side device becomes.

So, according to one example of the present invention, the antenna ports are configured to have each antenna for equal frequency. When selecting 2 antennas from 4 antennas, there can be 6 candidates for combination. And, when selecting 4 candidate for combination from the above 6 candidates, there are 15 methods for this configuration.

If a specific antenna is more frequently selected comparing to the other antennas, such as '1 (1,2) (1,3) (1,4) (2,3)|2 (1,2) (2,3) (2,4) (3,4) ...', the specific defect on that antenna may influence the overall performance (even though it may be averaged by using the spatial modulation scheme as proposed above). So, in this example, each antenna is selected with substantially equal frequency to be used for configuring the virtual antenna port. For example, the antenna ports 1, 2, 3 may be configured as '1 (1,2) (1,3) (2,4) (3,4)|2 (1,2) (1,4) (2,3) (3,4) 13 (1,3) (1,4) (2,3) (2,4) ....'

In order to implement the above scheme, the transmitting side device shall inform the receiving side device the number of antennas to be used for transmitting signals, and how the antenna ports are configured. In another example, the transmitting side device may inform the receiving side device of the number of antennas used for transmitting signals, and the configuration information of the antenna ports may be acquired based on the resource mapping.

The above antenna port configuration may vary for each transmission symbol. As mentioned before, the defect specific to a specific antenna may influence the overall performance of the above transmission scheme. So, frequently changing the antenna port configuration may help this problem. For this end, the transmitting side device may inform the receiving side device of how the antenna port configuration changes.

Figure 14:
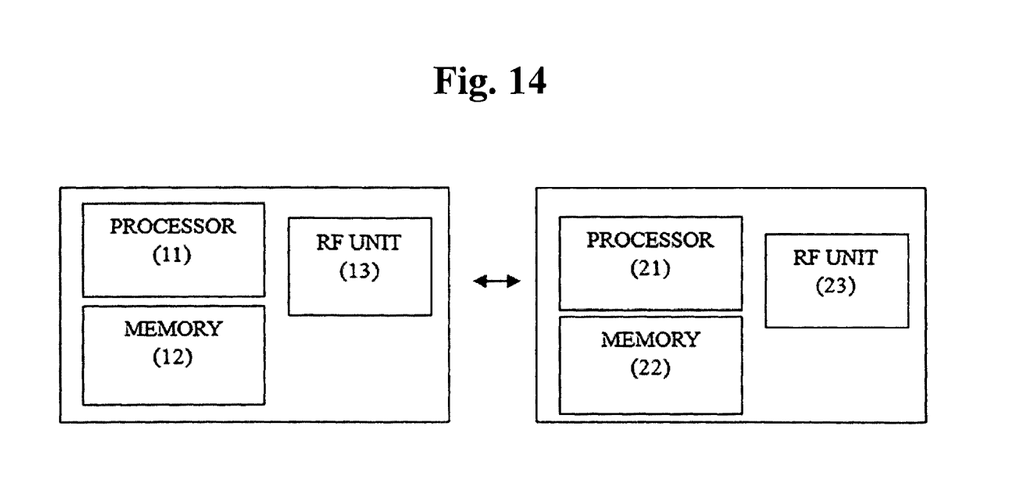
FIG. 14 is a block diagram for a configuration of a communication device according to one embodiment of the present invention.

FIG. 14 is a block diagram for a configuration of a communication device according to one embodiment of the present invention.

Referring to FIG. 14, a communication device may be configured by including a processor 11, a memory 12 and an RF module 13. The communication device can communicate with a different communication device that includes the above-mentioned configuration 21, 22 and 23.

One communication device shown in FIG. 14 may include a UE, while the other may include a base station. The communication device shown in FIG. 14 is illustrated for clarity of the description and modules included in the communication device may be omitted in part. And, the communication device may further include necessary module(s).

The processor 11/21 in the communication device can perform most of controls for implementing the above-described methods according to the embodiments of the present invention. The memory 12/22 is connected to the processor 11/21 so as to store necessary information. The RF unit 13/23 transceives radio signals and is able to forward them to the processor 11/21.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The above explained spatial modulation scheme can be used in various wireless communication system, such as IEEE 802.11 system, 802.16 system, LTE/LTE-A and 5G communication system.

The invention claimed is:

1. A method of transmitting signals by a transmitting side device having multiple antennas (hereinafter 'N antennas'), the method comprising:
spatially modulating information to be transmitted, wherein the information is spatially modulated to be represented based on which antennas among the N antennas are selected to be used for transmission; and
transmitting the spatially modulated information through the selected antennas,
wherein a number of the selected antennas for transmitting one transmission information unit (hereinafter, 'M' where M≤N) is plural,
wherein different sequence of the selected antennas represents different information to be transmitted,
wherein '01' and '10' are used for representing different information to be transmitted,
wherein 'M' is 2, wherein '01' represents a first case where the one transmission information unit is transmitted through a first antenna first of the 2 antennas and then a second antenna of the 2 antennas, and
wherein '10' represents a second case where the one transmission information unit is transmitted through the second antenna first and then the first antenna.

2. The method of claim 1, wherein the one transmission information unit is generated based on linear combination of a plurality of information units, and
wherein a number of the plurality of information units corresponds to M.

3. The method of claim 2, wherein the each of the information units corresponds to a QAM (Quadrature Amplitude Modulation) symbol.

4. The method of claim 1, wherein the number of the selected antennas (M) is equal to the number of multiple antennas (N).

5. The method of claim 1, wherein '00' and '11' are not used for representing the information to be transmitted.

6. The method of claim 1, wherein the one transmission information unit is generated by:

$(S1-S2)\sqrt{2}$, or $(S1+S2)\sqrt{2}$, and wherein 'S1' and 'S2' represent each of information units.

7. The method of claim 1, further comprising:
exchanging information on which sequence of the selected antennas represents which information to be transmitted with a receiving side device.

8. A method of receiving signals transmitted via multiple transmission antennas (hereinafter 'N antennas') by a receiving side device, the method comprising:
estimating channels between one or more reception antennas and the multiple transmission antennas;
receiving spatially modulated information based on estimated channel information; and demodulating the spatially modulated information, wherein the spatially modulated information is represented based on which transmission antennas among the N antennas were used for transmission; and wherein a number of the used transmission antennas used for transmitting one transmission information unit (hereinafter, 'M' where M≤N) is plural, wherein different sequence of the transmission antennas used for transmission represents different information, wherein '01' and '10' are used for representing different information, wherein 'M' is 2, wherein '01' represents a first case where the one transmission information unit is transmitted through a first transmission antenna first of the 2 transmission antennas and then a second antenna of the 2 antennas, and wherein '10' represents a second case where the one transmission information unit is transmitted through the second transmission antenna first and then the first transmission antenna.

9. The method of claim 8, wherein the one transmission information unit is generated based on linear combination of a plurality of information units, and wherein a number of the plurality of information units corresponds to M.

10. The method of claim 9, wherein the each of the information units corresponds to a QAM (Quadrature Amplitude Modulation) symbol.

11. The method of claim 8, wherein the number of the transmission antennas (M) used for transmission is equal to the number of multiple transmission antennas (N).

12. The method of claim 8, wherein '00' and '11' are not used for representing the information.

13. The method of claim 8, wherein the one transmission information unit is generated by:

$(S1-S2)\sqrt{2}$, or $(S1+S2)\sqrt{2}$, and wherein 'S1' and 'S2' represent each of information units.

* * * * *